United States Patent
Weber et al.

(10) Patent No.: US 9,827,900 B2
(45) Date of Patent: Nov. 28, 2017

(54) METHOD OF OPERATING A HEADLIGHT HAVING A LASER LIGHT SOURCE IN A MOTOR VEHICLE

(71) Applicant: Bayerische Motoren Werke Aktiengesellschaft, Munich (DE)

(72) Inventors: Stefan Weber, Stadtbergen (DE); Helmut Erdl, Flintsbach (DE); Johannes Aulbach, Reichertshausen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 635 days.

(21) Appl. No.: 14/460,686

(22) Filed: Aug. 15, 2014

(65) Prior Publication Data
US 2015/0055668 A1    Feb. 26, 2015

(30) Foreign Application Priority Data
Aug. 21, 2013 (DE) .................. 10 2013 216 572

(51) Int. Cl.
*B60Q 1/08* (2006.01)
*F21S 8/10* (2006.01)
(Continued)

(52) U.S. Cl.
CPC ........... *B60Q 1/085* (2013.01); *B60Q 1/1423* (2013.01); *F21S 48/1145* (2013.01);
(Continued)

(58) Field of Classification Search
CPC ... B60Q 1/085; B60Q 1/1423; F21S 48/1145; F21S 48/1195
See application file for complete search history.

(56) References Cited

U.S. PATENT DOCUMENTS

| 5,266,955 | A  | 11/1993 | Izumi et al. |
| 6,877,879 | B2 | 4/2005  | Holz et al.  |

(Continued)

FOREIGN PATENT DOCUMENTS

| DE | 42 22 409 A1  | 1/1993 |
| DE | 197 07 936 A1 | 9/1998 |

(Continued)

OTHER PUBLICATIONS

German language Search Report dated Mar. 12, 2014, with English translation (Ten (10) pages).

*Primary Examiner* — Thomas M Sember
(74) *Attorney, Agent, or Firm* — Crowell & Moring LLP

(57) ABSTRACT

A method is provided for operating a headlight having a laser light source in a motor vehicle. The headlight generates a light distribution from the light of the laser light source. The laser light source is activated such that the operating power of the laser light source is switched from a first power value to a deactivated operating state or is lowered to a second power value when the speed of the motor vehicle falls below a first speed threshold. The operating power of the laser light source is increased from the deactivated operating state or from the second power value to the first power value, when the speed of the motor vehicle exceeds a second speed threshold, which is greater than or equal to the first speed threshold.

20 Claims, 1 Drawing Sheet

(51) Int. Cl.
*B60Q 1/14* (2006.01)
*F21Y 113/20* (2016.01)
(52) U.S. Cl.
CPC ..... *F21S 48/1195* (2013.01); *B60Q 2300/112* (2013.01); *F21Y 2113/20* (2016.08)

(56) References Cited

U.S. PATENT DOCUMENTS

| | | | |
|---|---|---|---|
| 2009/0190323 A1* | 7/2009 | Watanabe | B60Q 1/143 362/37 |
| 2013/0218410 A1* | 8/2013 | Chen | B60Q 1/143 701/36 |

FOREIGN PATENT DOCUMENTS

| | | |
|---|---|---|
| DE | 197 30 414 A1 | 1/1999 |
| DE | 101 26 492 A1 | 12/2002 |

* cited by examiner

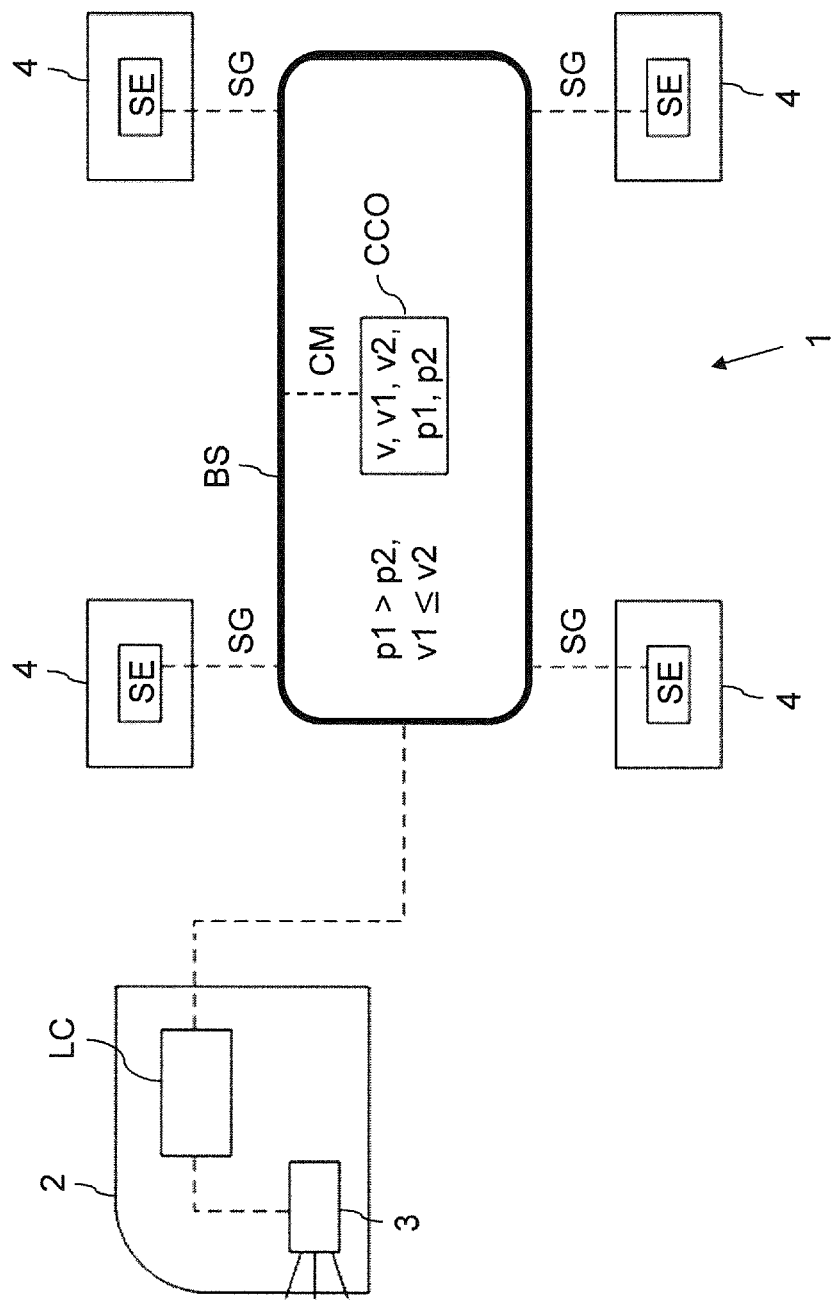

METHOD OF OPERATING A HEADLIGHT HAVING A LASER LIGHT SOURCE IN A MOTOR VEHICLE

CROSS REFERENCE TO RELATED APPLICATIONS

This application claims priority under 35 U.S.C. §119 from German Patent Application No. 10 2013 216 572.2, filed Aug. 21, 2013, the entire disclosure of which is herein expressly incorporated by reference.

BACKGROUND AND SUMMARY OF THE INVENTION

The invention relates to a method of operating a headlight having a laser light source in a motor vehicle as well as to a corresponding headlight.

When laser light sources are used in motor vehicle headlights, there is the problem that, as a result of the high luminance of such light sources, eye injuries may occur in other traffic participants in the event of a prolonged blinding caused by the headlight. Such endangering of other traffic participants should be eliminated to the largest extent.

It is therefore an object of the invention to provide a method of operating a headlight having a laser light source in a motor vehicle, so that danger to other traffic participants caused by the laser light source are considerably reduced or eliminated.

This and other objects are achieved by the method according to the invention for operating a laser headlight, and a corresponding laser headlight, which generates a light distribution from the light of a laser light source, which as a rule includes one or more laser diodes. This light distribution may, for example, be a high-beam light distribution or a low-beam light distribution in the far field of the vehicle. The headlight preferably is a front headlight. Within the scope of the method according to the invention, the laser light source of the headlight is activated such that the operating power of the laser light source is switched from a first power value to a deactivated operating state or is reduced to a second (lower) power value, when the speed of the motor vehicle falls below a first speed threshold. Switching to a deactivated operating state is the switching-off of the operation of the laser light source (i.e. operating power of zero). The first power value and the second power value represent operating powers of greater than zero. The first power value may be understood to be a power value that presents the normal operation of the laser light source. The first power value may, for example, represent the maximal operating power of the laser light source.

For activating the laser light source, the method according to the invention also uses a second speed threshold, which is greater than or equal to the first speed threshold. In this case, the operating power of the laser light source is increased from the deactivated operating state or from the second power value to the first power value when the speed of the motor vehicle exceeds the second speed threshold.

The method according to the invention is based on the recognition that, at low vehicle speeds, a traffic participant's eyes may be at a close distance from the headlight and a prolonged exposure of the eyes to the laser radiation of the headlight may occur. At an excessive luminous intensity of the laser light source, this may result in injury to the eye. At low speeds, the laser light source is therefore switched off or, as a result of the lowering of its operating power, the light intensity of brightness is appropriately dimmed. In this case, the operating power is the optical power of the laser light source, which is correlated with the supplied electric power as well as the brightness of the laser light source. A higher optical operating power results in a greater brightness or luminous intensity of the laser light source.

In a preferred variant, the activation of the laser light source is further developed such that, when generating the light distribution by the headlight, the laser light source complies with Class 1 or 1M or 2 or 2M according to the IEC 60825-1 Standard. This standard classifies lasers with respect to the endangerment of the user. The higher the classification number, the greater the danger to the user. The above-mentioned classes are associated with a slight endangerment of the eye. The adaptation of the laser light source corresponding to the above-mentioned standard takes place by establishing the above-defined speed thresholds or power values. Based on the standard, a person skilled in the art can appropriately determine the thresholds or power values for complying with the corresponding class. As required, the activation of the laser light source may also be such that, when generating the light distribution by the headlight, the laser light source belongs to a defined (low) risk group according to the IEC 62471 Standard.

In a particularly preferred embodiment, the first speed threshold is between 20 km/h and 120 km/h, preferably between 20 km/h and 60 km/h, whereas the second speed threshold is between 30 km/h and 130 km/h, preferably between 30 km/h and 70 km/h. Above these thresholds, the danger to the eyes of any traffic participants is negligible because of the high speed of the vehicle. In a further variant, the second power value amounts to 50% or less of the first power value, particularly 25% or less or preferably 20% or less of the first power value. This ensures a strong dimming of the laser light source during a slow drive.

In a further development, the method according to the invention is used for operating a headlight which, in addition to the laser light source, includes at least one additional light source which is constantly switched on for generating the light distribution by the headlight. It is thereby ensured that, also at lower speeds, the generating of the desired light distribution is ensured (with reduced intensity). The at least one additional light source preferably comprises an LED light source, a halogen light source and/or a xenon light source. The glare of these light sources does not endanger the eyes.

As required, the at least one additional light source may also include a further laser light source which, when the light distribution is generated by the headlight, complies with Class 1 or 1M or 2 or 2M according to the IEC 60825-1 Standard. This further laser light source has a significantly lower intensity than the laser light source controlled in the process according to the invention. In particular, independently of the vehicle speed (i.e. also when the vehicle is stopped), it never endangers the eyes of other traffic participants.

In a further embodiment, several different light distributions can be generated by means of the headlight, in which case, the method according to the invention or preferred variants of the method according to the invention are implemented for at least one of the light distributions and, particularly, for each of the light distributions. The different light distributions particularly include one or more (different) low-beam light distributions and/or one or more (different) high-beam light distributions. The method of the invention is preferably implemented for the high-beam light distribution.

In a concrete implementation of the method according to the invention, the speed of the vehicle, which is processed when activating the laser light source, is determined by way of sensor data by one or more rotational wheel speed sensors, the sensor data preferably being stored via a bus (i.e. a data bus) of the motor vehicle and are retrieved via the bus for determining the speed of the motor vehicle.

In a variant of the above-described embodiment, the speed is determined in a central control unit of the motor vehicle, the activating of the laser light source being caused such that the central control unit generates commands for changing the operating power of the laser light source based on the determined speed of the motor vehicle, and based on the commands, a headlight control unit changes the operating power of the laser light source.

These commands permit the activation of the laser light source according to the invention as a function of the first and second speed thresholds as well as based on the first and second power value. In a preferred variant, the commands are placed by the central control unit on the above-described bus and are retrieved from the latter by way of the headlight control unit. Preferably, the central control unit retrieves the sensor data of the rotational wheel speed sensors also from the bus in order to determine the vehicle speed in this manner.

As required, the activation of the laser light source may also be carried out without a central control unit.

In this case, the speed of the motor vehicle is determined in a headlight control unit, the activation of the laser light source being caused by the headlight control unit. In a preferred variant, the headlight control unit retrieves the sensor data of the rotational wheel speed sensor or sensors by way of the above-described bus.

The invention further relates to a motor vehicle, comprising a laser light source from whose light a light distribution is generated during the operation of the headlight. During the operation of the headlight, the laser light source is activated such that the operating power of the laser light source is switched from a first power value to a deactivated operating state or is lowered to a second power value when the speed of the motor vehicle falls below a first speed threshold, and the operating power of the laser light source is increased from the deactivated operating state or from the second power value to the first power value when the speed of the motor vehicle exceeds a second speed threshold which is greater than or equal to the first speed threshold. The headlight according to the invention is preferably set up for the implementation of one or more of preferred variants of the method according to the invention.

Furthermore, the invention relates to a motor vehicle which comprises one or more headlights according to the invention or one or more preferred variants of the headlight according to the invention.

Other objects, advantages and novel features of the present invention will become apparent from the following detailed description of one or more preferred embodiments when considered in conjunction with the accompanying drawing.

BRIEF DESCRIPTION OF THE DRAWING

FIG. 1 is a schematic block diagram view of the components of a motor vehicle according to an embodiment of the invention.

An embodiment of the invention will be described in detail by reference to FIG. 1. This FIGURE is a schematic block diagram view of the components in a motor vehicle by which a variant of the method according to the invention is implemented.

DETAILED DESCRIPTION OF THE DRAWING

In the following, the control of the two front headlights of a motor vehicle will be described as an example, each front headlight including, in addition to a laser light source, a further light source, which preferably is an LED light source. The laser light source is used only in addition to the LED light source when the high beam of the vehicle is switched on and is deactivated at normal low-beam light. The laser light source is controlled based on a variant of the method according to the invention. In other words, the method according to the invention in the embodiment described here is always used when the high-beam light is switched on. The method can nevertheless also be implemented when other light distributions are generated, such as a low-beam light distribution, if the laser light source is activated in the case of these light distributions.

In FIG. 1, particularly the wheels 4 of the vehicle as well as one of the front headlights 2 are illustrated, both headlights being activated in the same manner. The headlight 2 includes the above-mentioned laser light source 3, which is used together with an additional (not illustrated) LED light source for generating a high-beam light distribution. When generating a low-beam light distribution, only the additional LED light source is used and the laser light source 3 is switched off. The laser light source 3 generates laser light by way of one or more laser diodes. By way of a (not shown) secondary lens system, this laser light is converted to the desired light distribution on the road in front of the vehicle. In comparison to LED light sources, the brightness or intensity of the laser light source is significantly greater, so that it has to be ensured that, when other traffic participants are blinded, they will not suffer eye injuries as a result of the switched-on laser light source. As indicated in the further description, this is ensured by means of the method according to the invention.

The laser light source 3 as well as the additional LED light source are activated by way of a headlight control unit LC. According to FIG. 1, the headlight control unit is provided in the headlight. As required, the headlight control unit may, however, also be mounted outside the headlight. The data connection between the headlight control unit LC and the laser light source 3 is indicated by a broken line. Here and in the following, all data connections between components of the motor vehicle or between one component of the motor vehicle and the bus described in the following are indicated by broken lines. The headlight control unit LC causes a switching-on or switching-off of the laser light source 3 or a change of the operating power of the laser light source 3. The operating power represents the sum of the optical operating powers of all laser diodes of the laser light source 3. The light intensity or brightness of the laser light source is regulated by changing the operating power. In this case, the optical operating power of a laser diode correlates with a corresponding electric power, which is supplied to the laser diode. The control unit LC is coupled to a data bus BS known per se (indicated by a bold line), this data bus preferably being a CAN bus. Four rotational wheel speed sensors SE are additionally coupled to the CAN bus by way of corresponding data connections. One rotational speed sensor SE is installed in each of the wheels 4. Furthermore, a central control unit CCO, which, as a rule, is installed in each motor vehicle, has access to the CAN bus BS.

The activation of the laser light source 3 described here is characterized in that, when the high-beam light is switched on, the laser light source is switched off or dimmed at low speeds, or is connected or operated at full power only starting from a defined speed value. In this case, the fact is taken into account that, at lower vehicle speeds, a prolonged blinding exposure of traffic participants, such as pedestrians on the edge of the road, may occur, or the distances between the laser light source and the eyes of traffic participants may be shorter. Thus, because of the high intensity of the laser light source, eye injuries may occur at a low speed when the eyes are exposed to the laser light source. In order to avoid such injuries, the laser light source is deactivated at lower speeds or its operating power is reduced.

In the embodiment described here, the central control unit CCO participates in the control of the laser light source 3. This unit retrieves the sensor data or sensor signals SG of the individual rotational wheel speed sensors SE cyclically placed on the bus SE and determines therefrom, in a manner known per se, the current speed v of the motor vehicle. When determining this vehicle speed, normally a plausibility check of the sensor data is also carried out in order to take into account that certain sensor signals, under certain circumstances, may not represent the actual speed of the vehicle, for example, in the event of a spinning of the corresponding wheel on slippery ice. For controlling the laser light source, a first speed threshold v1, a second speed threshold v2, a first power value p1 and a second power value p2 are additionally stored in the central control unit CCO. In this case, the first power value p1 is greater than the second power value p2. The power values correspond to (optical) operating powers of the laser light source 3 which are set as a function of the vehicle speed. The first and second power values represent non-zero operating powers.

In a preferred variant, the second power value amounts to 50% or less of the first power value, so that a strong dimming of the laser radiation is caused. For setting the power value, a pulse width modulation is preferably used. Within a cycle of the pulse width modulation, the corresponding laser diode is switched on and switched off for a predetermined time period. By means of the variation of the ratio of the switched-on and switched-off state (also called duty factor), the power of the laser diode can be varied in a suitable manner.

In a particularly preferred embodiment, no second power value is used within the scope of activating the laser light source. Instead, the laser light source is deactivated, i.e. the operating power is set to zero. In contrast to the power values, the first speed threshold v1 represents a vehicle speed which is lower or, as required, exactly as high as the speed according to the second speed threshold v2. The two speed values relate to vehicle speeds which, depending on the application case, are between 20 km/h and 70 km/h. When there is a falling below these speed values, under certain circumstances, a prolonged blinding exposure of the eyes of other traffic participants or a short distance between the eyes and the laser light source may occur, which may result in injuries.

Within the scope of the implementation of the control method, the sensors SE cyclically determine the sensor signals SG, which are placed on the bus BS and are retrieved by the central control unit CCO. The central control unit then also cyclically determines the current speed v of the motor vehicle. If it is determined that the high-beam light is switched on, the central control unit will check whether, in comparison to the vehicle speed determined in the last cycle, the vehicle speed has fallen below the first speed threshold v1. If this is so, the central control unit will generate a command CM, which specifies that the laser light source, which is currently being operated at a high operating power p1, is reduced to the lower operating power p2 or is switched off. The command CM is again placed on the bus BS and is retrieved by the headlight control unit LC. Based on this command, the headlight control unit then initiates the corresponding dimming or switching-off of the laser light source, so that it is ensured that no eye injuries of other traffic participants can occur during a slow drive.

As long as, in the further operation of the vehicle, the vehicle speed remains below the second speed threshold v2, the laser light source continues to be operated with the second power value p2 or remains in the switched-off state. When finally the central control unit determines a vehicle speed v which exceeds the second speed threshold v2, the central control unit will generate a command CM, which specifies that the laser light source is again switched to the higher first power value, so that the light intensity of the laser light source and thereby of the high-beam light is increased again. In this case, it is taken into account that, at higher speeds of the motor vehicle, the exposure time, during which the eyes of other traffic participants may be exposed to the laser radiation, is significantly lower, and also only larger distances can occur between the eyes and the laser light source. The higher light intensity of the laser light source will thereby not result in injury to the eyes.

In a particularly preferred embodiment, the speed thresholds v1 and v2 as well as the operating power values p1 and p2 are selected such that, during the operation in the vehicle, the laser light source complies at every point in time at least with Laser Protection Class 2 or 2M and, as required, also with Laser Protection Class 1 or 1M. The above-mentioned classes are defined in the IEC 60825-1 Standard. With respect to classifications with higher numbers, these laser protection classes are largely safe in regard to eye injuries.

The embodiment of FIG. 1 is based on a control which is implemented while using the central control unit CCO. In a modified variant, the possibility exists, however, that the control is carried out directly by the headlight control unit LC without any interposition of the central control unit CCO. In this case, the control unit LC also partially takes over the functions of the central control unit CCO according to the above-described embodiment. This means that the headlight control unit retrieves from the bus BS the current speed determined by the central control unit and, on its basis, then activates the laser light source by means of the speed thresholds and power values.

The embodiments of the invention described above have a number of advantages. In particular, a safe operation of laser light sources installed in vehicle headlights is made possible, so that it is ensured while the vehicle is driving that blinding caused by the laser light source does not result in eye injuries. It is a further advantage of the invention that, as a result of the reduction of the power or the switching-off of the laser light source, an overheating of the laser light source at lower speeds because of the reduced air stream is avoided. In this case, it should be taken into account that high demands are made on the cooling of the laser light sources, because laser diodes can only be operated up to an operating range of approximately 85° C., whereas conventional LEDs are operable up to approximately 100° C.

REFERENCE SYMBOLS

1 Motor vehicle
2 Headlight
3 Laser light source
4 Wheels of motor vehicle
LC Headlight control unit
CCO Central control unit
SE Rotational wheel speed sensor
SG Sensor data of rotational wheel speed sensors
CM Commands of central control unit
BS Data bus
v Current vehicle speed
p1 First power value
p2 Second power value
v1 First speed threshold
v2 Second speed threshold The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of operating a headlight in a motor vehicle, the headlight having a laser light source and generating a light distribution from light of the laser light source, the method comprising the acts of:
    lowering an operating power of the laser light source from a first power value to a second power value or to a deactivated operating state when a speed of the motor vehicle falls below a first speed threshold; and
    increasing the operating power of the laser light source from the second power value to the first power value or from the deactivated operating state to the first power value when the speed of the motor vehicle exceeds a second speed threshold, the second speed threshold being greater than the first speed threshold.

2. The method according to claim 1, further comprising the act of: operating the laser light source in compliance with Class 1 or 1M or 2 or 2M according to IEC 60825-1 Standard when generating the light distribution by the headlight.

3. The method according to claim 1, wherein the first speed threshold is between 20 km/h and 120 km/h, and the second speed threshold is between 30 km/h and 130 km/h.

4. The method according to claim 3, wherein the second power value is 50% or less of the first power value.

5. The method according to claim 3, wherein the second power value is 25% or less of the first power value.

6. The method according to claim 1, wherein the first speed threshold is between 20 km/h and 60 km/h, and the second speed threshold is between 30 km/h and 70 km/h.

7. The method according to claim 6, wherein the second power value is 20% or less than the first power value.

8. The method according to claim 1, wherein the headlight comprises at least one further light source in addition to the laser light source, the method further comprising the act of: maintaining the at least one further light source constantly switched-on when generating the light distribution by the headlight.

9. The method according to claim 8, wherein the at least one further light source comprises an LED light source, a halogen light source, and/or a xenon light source.

10. The method according to claim 8, wherein the at least one further light source comprises a further laser light source, the method further comprising act of: operating the further laser light source in compliance with Class 1 or 1M or 2 or 2M according to IEC 60825-1 Standard when the light distribution is generated by the headlight.

11. The method according to claim 1, further comprising the acts of:
    generating several different light distributions by the headlight; and
    implementing the lowering and increasing acts for at least one of the several different light distributions.

12. The method according to claim 11, wherein the several different light distribution comprise one or more low-beam distributions and/or one or more high-beam light distributions.

13. The method according to claim 1, further comprising the act of: determining the speed of the motor vehicle via sensor data of one or more rotational wheel speed sensors, the sensor data being placed on a bus of the motor vehicle and being retrieved from the bus for determining the speed of the motor vehicle.

14. The method according to claim 13, further comprising the acts of:
    determining the speed of the motor vehicle in a central control unit of the motor vehicle, the central control unit retrieving the sensor data from the bus;
    generating commands via the central control unit for changing the operating power of the laser light source based on the determined speed of the motor vehicle; and
    changing the operating power of the laser light source via a headlight control unit based on the commands generated by the central control unit, the commands generated by the central control unit being placed on the bus and being retrieved from the bus by the headlight control unit.

15. The method according to claim 13, further comprising the acts of:
    determining the speed of the motor vehicle via a headlight control unit; and
    changing the operating power of the laser light source via the headlight control unit, the headlight control unit retrieving the sensor data of the rotational wheel speed sensors via the bus.

16. A headlight for a motor vehicle, comprising:
    a laser light source providing light for generating a light distribution during operation of the headlight, wherein the laser light source is activatable such that operating power of the laser light source is lowered from a first power value to a second power value or to a deactivated operating state when a speed of the motor vehicle falls below a first speed threshold, and
    the laser light source is activatable such that the operating power of the laser light source is increased from the deactivated operating state or from the second power value to the first power value when the speed of the motor vehicle exceeds a second speed threshold greater than the first speed threshold.

17. The headlight according to claim 16, further comprising: at least one further light source, wherein the at least one further light source is constantly switched-on when the headlight generates the light distribution.

18. The headlight according to claim 17, wherein the at least one further light source comprises an LED light source, a halogen light source, a xenon light source and/or a further laser light source.

19. The headlight according to claim 16, wherein the laser light source is configured in compliance with Class 1 or 1M or 2 or 2M according to IEC 60825-1 Standard when the headlight generates the light distribution.

20. A motor vehicle, comprising:
one or more headlights, each headlight comprising a laser light source providing light for generating a light distribution during operation of the headlight, wherein
the laser light source is activatable such that operating power of the laser light source is lowered from a first power value to a second power value or to a deactivated operating state when a speed of the motor vehicle falls below a first speed threshold, and
the laser light source is activatable such that the operating power of the laser light source is increased from the deactivated operating state or from the second power value to the first power value when the speed of the motor vehicle exceeds a second speed threshold greater than the first speed threshold.

* * * * *